March 29, 1932. J. J. GOELLNER 1,851,171
STAPLER MECHANISM CLUTCH
Filed Jan. 29, 1930
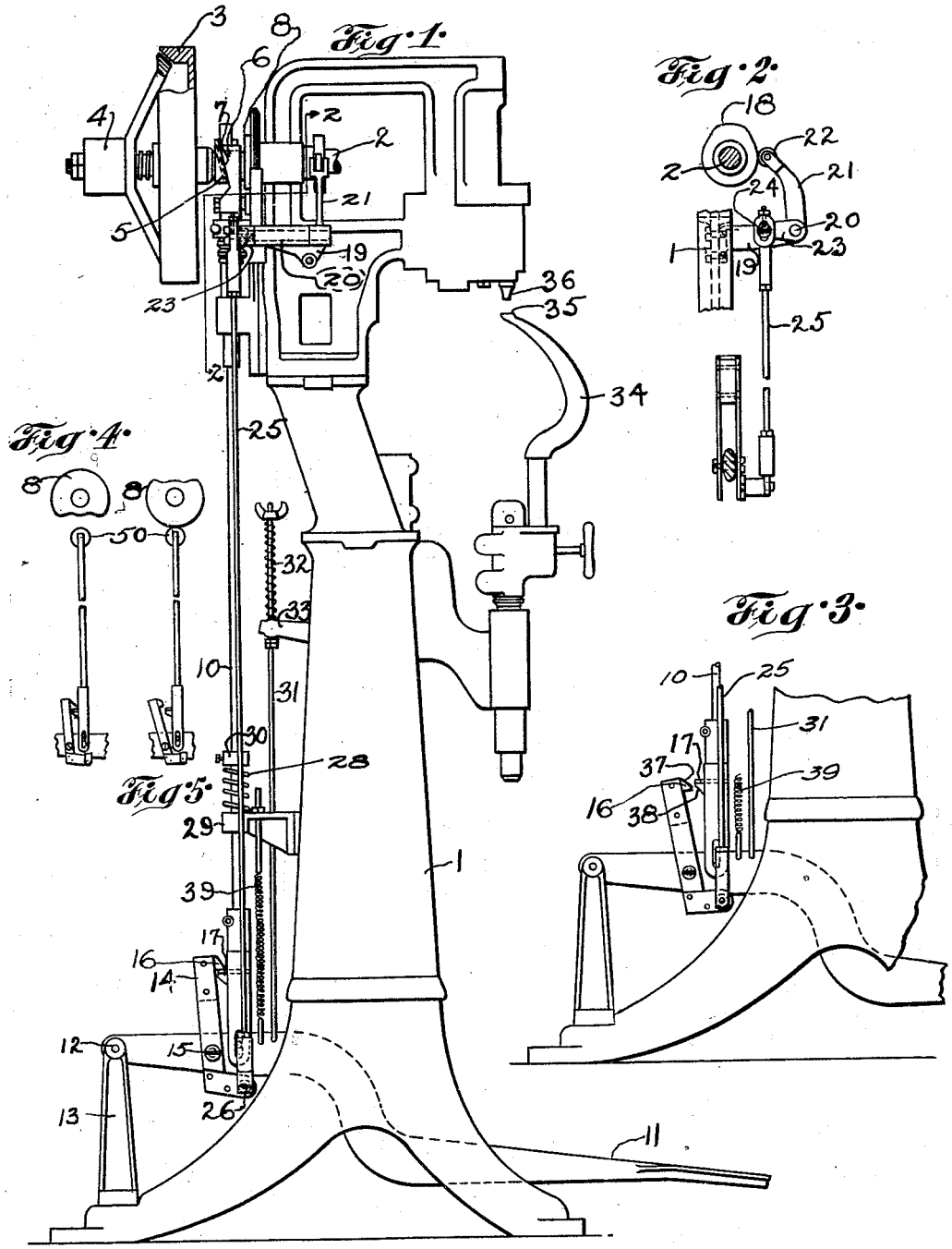
Inventor
Joseph J Goellner
By Rodney Bedell
Attorney Patented Mar. 29, 1932

1,851,171

UNITED STATES PATENT OFFICE

JOSEPH J. GOELLNER, OF ST. LOUIS, MISSOURI, ASSIGNOR TO LANDIS MACHINE COMPANY, OF ST. LOUIS, MISSOURI, A CORPORATION OF MISSOURI

STAPLER MECHANISM CLUTCH

Application filed January 29, 1930. Serial No. 424,307.

My invention relates to machinery used in the manufacture of shoes and more particularly to a machine to be used for driving fasteners through the sole of a shoe and parts associated therewith.

My present invention has been developed with the particular view of applying the same to a shoe stapler of the type illustrated in Patent Number 1,016,930, issued February 13, 1912 to W. H. Borden. A machine of this type is actuated by the depression of a treadle for the driving of each staple. The depression of the treadle by the operator's foot causes a clutch between the machine and the driving mechanism to function, which clutch is automatically disengaged at the end of each driving operation if the treadle is not held down.

In running such a machine, the operator must release the treadle and shift the shoe after the driving of each staple and before the driving of the succeeding staple.

If the utmost skill is not used, more than one staple may be driven at the same place or the staples may not be spaced properly. It is the general object of my present invention to provide such a machine with a device that will automatically release the clutch at the proper time during each cycle of operations of the machine.

My present invention, though of different construction, has all of the advantages set forth in my copending application filed September 11, 1929, Serial Number 391,790 and in addition has certain advantageous features not present in the structure of my copending application.

Now, in the structure of my copending application, dependence is placed upon the strength of a spring to keep the latch in engaged position and rather exact relative adjustment of the various members is necessary to prevent the clutch from releasing too soon or too late. It would be possible in this structure, if the adjustment were not correct, for the clutch releasing mechanism to prevent the clutch from being engaged at all or, on the other hand, the adjustment might be such that the treadle could be depressed and the machine continue to operate without the clutch being released at all.

A particular object of my present invention is to provide a positive clutch release means that will function in every cycle of the operations of the machine at the proper time without regard to how far the treadle is depressed and without requiring special skill or attention in the adjustment or the assembling or setting up of each machine.

In the accompanying drawings which illustrate a selected embodiment of my invention—

Figure 1 is a side elevation of a stapler showing my clutch engaging and releasing apparatus.

Figure 2 is a sectional view of the same taken on the line 2—2 of Figure 1.

Figure 3 is a similar view of some of the parts in the lower portion of Figure 1, but shown in a different position.

Figures 4 and 5 are diagrammatic views of the relation between one of the clutch operating cams and the interengaging elements of my invention associated therewith.

The frame of the machine is indicated at 1. Near the top thereof is journalled the main shaft 2 which mounts a loose pulley 3 adapted to be driven by a belt from a motor or counter-shafting in the conventional manner.

A clutch disk having a hub 4 is fixed on the shaft 2 and is adapted to engage the rim of the pulley 3 when the latter is moved toward the disk. The collar 5 is freely mounted on the shaft 2 and engages both the pulley hub and a yoke 6 which is movable transversely of the shaft. The interengaging surfaces of the collar 5 and yoke 6 are in a plane between the horizontal and the vertical axes of the machine as indicated at 7 whereby downward movement of the yoke thrusts the collar 5 to the left thereby moving the clutch disk into engagement with the pulley 3 whereby shaft 2 is rotated to operate the machine. A cam 8 on shaft 2 engages a cam roller 50 on yoke 6 as soon as the shaft starts to rotate and holds the yoke down until the rotation of the shaft is completed when the roller is freed from the cam and yoke 6 may rise, thereby releasing the clutch disk from the pulley.

Yoke 6 is operated by pull rod 10. A treadle 1 is fulcrumed at 12 on a bracket 13 mounted on the base of the frame 1 and a bell crank latch member 14 is pivoted at 15 to the treadle 11 and has a hook-like upper end provided with a downwardly-facing element 16. A cooperating upwardly-facing element 17 is mounted on the lower end of pull rod 10. The rod 25 holds the latch 14 in substantially vertical position until the rod is moved as hereinafter explained.

Fixedly mounted on the shaft 2 is a cam 18. Attached to the side of the frame 1 is a bracket 19 journalling a pin 20. Fixedly mounted on the ends of pin 20 are arm 21 having a roller 22 engaging the cam 18, and arm 23 pivoted to rod 25 at 24.

The rod 25 is pivoted to the lower end of the bell crank latch member 14 at 26. Thus, when the projecting portion of cam 18 engages roller 22, arm 21 is pushed outwardly on the pin 20 and arm 23 consequently is pushed upwardly lifting rod 25 and turning latch 14 on pivot 15 so that the latch disengages pull rod 10, permitting spring 28, acting on bracket 29 seated on frame 1 and collar 30 on rod 10, to push rod 10 upwardly and disengage the clutch when the low portion of cam 8 is over roller 50.

A link 31 extends upwardly from treadle 11 and through spring 32 operates a lever 33 to raise the shoe support 34 to clamp the shoe between anvil 35 and the stapler throat 36 in the usual manner.

Operation: When the operator steps on the treadle 11 and depresses the same sufficiently to cause the elements 16 and 17 to engage one another and the rod 10 and yoke 6 to be pulled downwardly, the clutch is engaged and the machine starts its cycle of operations.

The two cams 8 and 18 are so placed on the shaft 2 that by the time the latch 14 and pull rod 10 are released by cam 18, cam 8 is in position to hold the clutch engaged. Thus, when the staple has been driven into the shoe, the projecting portion of cam 18 has rotated counter clockwise to the position where it engages the roller 22 and the latch release has been effected and the dwell of the cam 8 is engaging the roller 50 on the end of rod 10. As cam 8 approaches the position shown on the left side of Figure 4, the rod shoots up and the clutch is released. The projecting portion of the cam 18 by the end of this operation has passed beyond roller 22, a brake (not shown) has stopped the movement of shaft 2 and the arm 22 has moved inwardly again, returning the latch 14 to the vertical position. At this time, the spring 39 has raised the treadle 11 and the bevelled surfaces 37 and 38 slide upon each other until the portion 16 is above portion 17 and the machine is again ready for operation.

Obviously, many of the details of my invention may be modified without departing from the spirit of my invention and I contemplate the exclusive use of all such modifications as come within the scope of my claims.

I claim:

1. In a machine of the class described, a clutch, a clutch operating mechanism, a clutch driven shaft, cams rotated thereby, a manually operated clutch engaging device, means releasing said clutch from said device actuated by one of said cams, the other of said cams holding said clutch engaged after the starting of said machine until said release means has been actuated by said first cam.

2. In a machine of the class described, a clutch including interengaging rotating disks and yielding means normally thrusting said disks apart, a clutch actuating mechanism including a pull rod, and collars forced together by movement of said rod to positively move said disks into engagement, an operating lever, interengaging hook-like elements on said rod and lever respectively whereby said rod is moved by said lever, and a rotatable member disengaging said elements after predetermined operation of the machine.

3. In a machine of the class described, an operating shaft, a clutch for driving the same, a clutch actuating mechanism including a vertically disposed pull rod having an upwardly-facing element, a treadle, a latch pivoted between its ends on said treadle with its upper end extending adjacent to said rod and having a downwardly-facing element engaging said rod element, and a means driven by said shaft and connected to the lower end of said latch for disengaging said elements after movement of said rod by said treadle.

4. In a machine of the class described, an operating shaft, a clutch for driving the same, a clutch actuating mechanism including a vertically disposed pull rod having an upwardly-facing element, a treadle, a latch pivoted between its ends on said treadle with its upper end extending adjacent to said rod and having a downwardly-facing element engaging said rod element, a means driven by said shaft and connected to the lower end of said latch for disengaging said elements after movement of said rod by said treadle, said means returning said latch to position where said elements are engaged when said treadle and rod are raised.

5. In a machine of the class described, a frame, a treadle fulcrumed on said frame, a latch pivoted on said treadle, a cam, a member operated by said cam, said member being connected to said latch and adapted to move said latch on its pivot after a cycle of operations of the machine initiated by movement of said treadle, and a clutch actuating member adapted to be engaged by said latch after predetermined movement of said cam.

6. In a machine of the class described, a frame, a lever fulcrumed on said frame, a clutch actuating mechanism including a shaft, a cam driven thereby, a pull rod, a lateral projection on said rod, a bell crank latch pivoted on said lever and adapted to engage said projection, and means engaged by said cam and operatively connected to said latch adapted to disengage said latch and projection after movement of said latch by said lever and during a cycle of operations of the machine.

7. A structure as specified in claim 2 which also includes means automatically placing said hook-like elements in position to be interengaged again after a cycle of operations of the machine is completed.

8. A structure as specified in claim 2 which also includes means holding said clutch disks engaged throughout a cycle of operations of the machine irrespective of the disengagement of said hook-like elements.

9. A structure as specified in claim 2 which also includes means holding said rod in clutch engaging position throughout a cycle of operations of the machine irrespective of the disengagement of said hook-like elements.

In testimony whereof I hereunto affix my signature this 26th day of December, 1929.

JOSEPH J. GOELLNER.